United States Patent
Degtiarenko (10) Patent No.: US 10,281,600 B2
(45) Date of Patent: May 7, 2019

(54) NEUTRON DETECTOR AND DOSE RATE METER USING BERYLLIUM-LOADED MATERIALS

(71) Applicant: JEFFERSON SCIENCE ASSOCIATES, LLC, Newport News, VA (US)

(72) Inventor: Pavel V. Degtiarenko, Williamsburg, VA (US)

(73) Assignee: JEFFERSON SCIENCE ASSOCIATES, LLC, Newport News, VA (US)

(*) Notice: Subject to any disclaimer, the term of this patent is extended or adjusted under 35 U.S.C. 154(b) by 0 days.

(21) Appl. No.: 15/950,298

(22) Filed: Apr. 11, 2018

(65) Prior Publication Data

US 2018/0299570 A1 Oct. 18, 2018

Related U.S. Application Data

(60) Provisional application No. 62/485,098, filed on Apr. 13, 2017.

(51) Int. Cl.
*G01T 7/00* (2006.01)
*G01T 3/06* (2006.01)
*G01T 3/00* (2006.01)

(52) U.S. Cl.
CPC ............... *G01T 7/00* (2013.01); *G01T 3/00* (2013.01); *G01T 3/008* (2013.01); *G01T 3/06* (2013.01)

(58) Field of Classification Search
CPC .. G01T 3/00; G01T 3/06; G01T 3/008; G01T 7/00
See application file for complete search history.

(56) References Cited

U.S. PATENT DOCUMENTS

2017/0003400 A1* 1/2017 Carasco .................. G01T 3/00

OTHER PUBLICATIONS

I. O. Andersson, "Neutron rem-counter with uniform sensitivity from 0.025 eV to 10 MeV", in: Proceedings of the IAEA Symposium on neutron dosimetry, Vienna, 2:87-95, 1963.
C. Birattari et al., "An Extended Range Neutron Rem Counter", Nuclear Instruments and Methods in Physics Research A297:250-257, Elsevier Science Publishers, Holland, 1990.
R. H. Olsher, et al., "WENDI: An Improved Neutron REM Meter", Health Physics, 79(2):170ff, 2000, p. 170-181, Los Alamos, NM.

(Continued)

*Primary Examiner* — David P Porta (57) ABSTRACT

An apparatus and method for improving the sensitivity and energy response of neutron detectors and neutron dose rate meters. A beryllium layer is added to neutron detector moderators to improve the sensitivity of the detector. Energy dependence of the sensitivity is optimized by controlling the amount of beryllium in the moderator and by specifying the geometrical design parameters. The beryllium layer, in combination with additional material layers in the moderator, makes the detector response function correspond to the theoretical one in a wide range of energies. Response parameters of the neutron dose rate meter are within 20% of the theoretical response function in the neutron energy range from 500 keV to 10 GeV, and also in the energy range corresponding to thermal neutrons (about 1-100 meV).

19 Claims, 6 Drawing Sheets

(56) References Cited

OTHER PUBLICATIONS

J. M. Beeston, "Beryllium metal as a neutron moderator and reflector material", Nuclear Engineering and Design 14 (1970) 445-474 Idaho Falls, ID.
T. Otto et al., The ICRU Proposal for New Operational Quantities for External Radiation, Radiation Production Dosimetry (2017), Oxford University Press, 1-7.

* cited by examiner

NEUTRON DETECTOR AND DOSE RATE METER USING BERYLLIUM-LOADED MATERIALS

This application claims the priority of Provisional U.S. Patent Application Ser. No. 62/485,098 filed Apr. 13, 2017.

The United States Government may have certain rights to this invention under Management and Operating Contract No. DE-AC05-06OR23177 from the Department of Energy.

FIELD OF THE INVENTION

The present invention relates to radiation monitoring devices and more particularly to an apparatus for measuring radiation damage caused by neutrons of varying energies.

BACKGROUND

Conventional devices for measuring radiation damage caused by neutrons of varying energies, such as neutron dose rate meters, also known as rem meters, typically provide a response as a complex function of energy, corresponding to the so-called "conversion factors" theoretically calculated to represent the neutron radiation damage per unit of neutron fluence at a given neutron energy. The conversion factors are typically those recommended by ICRP (International Commission on Radiation Protection) publications, and their use is regulated by governing authorities such as the US Department of Energy.

The correspondence of conventional neutron detector responses to the set of conversion factors must be provided by the rem meter. Such detectors include neutron sensor devices having a good efficiency of detecting low energy "thermalized" neutrons, with those devices being contained in the "neutron moderator" envelopes. The moderators convert incident fluence of neutrons at any energy to the fluence of thermalized neutrons at the region around the sensor, such that the reaction rates correspond to the pre-calculated theoretical dose conversion factors. In this manner the detector response may be calibrated to be in rem units in a range of neutron energies suitable for the typical neutron radiation environment to be monitored.

Early neutron rem meters were designed to operate around nuclear power plants and their energy response was correspondingly limited at about 10 MeV. The moderators typically used polyethylene envelopes, with extra neutron absorbers inside to make the response functions more leveled.

However, neutron dose rate measurements at particle accelerators typically require neutron rem meters capable of detecting neutrons with energies above 10 MeV. One proposed method for solving this problem includes using a layer of a high-Z material inside of a poly moderator, such as the WENDI-type (Wide Energy Neutron Detection Instrument-type) moderator. The response functions of the WENDI-type neutron moderators generally exhibit rise of sensitivity to higher energy neutrons due to the (n, Xn) neutron multiplication reactions in the heavy nucleus, at energies above approximately 20 MeV. Generally, such type of moderators under-respond in the range of thermal neutron energies (1-100 meV) and in the range of 10-30 MeV where the contribution of the multiplication reactions is still relatively small, but they over-respond at higher neutron energies such as above 1 GeV.

Accordingly, one purpose of the present invention is to provide a higher sensitivity neutron moderator for use in rem meters with the response function better corresponding to the theoretical conversion factors. Another purpose of the present invention is to generally improve the energy response of such detectors.

Furthermore, reliable measurements of neutron dose rates at high energy electron accelerators and photon therapy facilities, in the conditions of high gamma radiation (γ-radiation), are needed in many instances including, for example, evaluations of damage to materials and electronics components, and monitoring of neutron doses to patients. Conventional devices are not capable of measuring neutron dose rates in the presence of high gamma radiation.

Accordingly, a method of detecting neutron doses in strong γ-radiation environments would be highly beneficial.

Objects and Advantages of the Invention

The object of the present invention is to provide a neutron radiation rem meter (dose meter) with improved sensitivity.

A further objective is to provide a neutron radiation rem meter having improved energy response.

Another objective is to provide a neutron radiation rem meter having a readout that corresponds to the theoretical energy response conversion factors in a wide energy range, including thermalized neutrons (1-100 meV) and in the range of 500 keV to 10 GeV.

A further objective is to provide a neutron detector capable of evaluating the radiation damage to electronics with the output calibrated to the 1-MeV neutron equivalent neutron fluence.

These and other objects and advantages of the present invention will be understood by reading the following description along with reference to the drawings.

SUMMARY OF THE INVENTION

The present invention provides an apparatus and method for improving sensitivity and energy response of neutron detectors and neutron radiation dose meter devices (rem-meters). The method includes adding beryllium (Be) to neutron detector moderators to improve the sensitivity of the detector. Energy dependence of the sensitivity may be adjusted by varying the amount of Beryllium in the moderator and by varying the geometrical design parameters. Response parameters of the prototype neutron monitor are within 20% of the theoretical response function in the neutron energy range from about 500 keV to 10 GeV, and also in the energy range corresponding to thermal neutrons (about 1-100 meV). Such neutron rem-meters may be used at facilities where high energy neutrons are potentially present. The energy response function of the neutron monitoring device may be tuned to the available theoretical model description of neutron damage to typical electronics components, measured in the units of equivalent fluence of 1-MeV neutrons. Correspondingly optimized moderator design according to the invention provides the neutron damage meter capable of evaluating the overall damage to the electronics circuits caused by neutrons in the range of energies up to 100 MeV.

A new type of neutron detector for use in such moderators is based on symmetric ionization chambers (IC) filled with $^3$He and $^4$He gases which allow operation of the neutron rate meters in heavy neutron and photon radiation fields, distinguishing between photon and neutron radiation. Such ICs have identical and relatively low sensitivity to photon radiation, and when placed next to each other inside the moderator, their response to the photon radiation field is identical. The response of the $^4$He IC to thermal neutrons is negligible, thus the difference of the IC readout currents between the $^3$He IC and the $^4$He IC will correspond purely to the fluence intensity of thermal neutrons inside the moderator, even in the presence of strong photon radiation fields.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

The present invention is a neutron dose rate meter having higher sensitivity and exhibiting a response function that better corresponds to the so-called "conversion factors" theoretically calculated to represent the neutron radiation damage per unit of neutron fluence at a given neutron energy. The method of the invention includes adding a layer of beryllium-rich or Be-loaded material, such as beryllium metal, beryllium alloys, or beryllium oxide (BeO) to the layers in a conventional multi-layer neutron moderator. Beryllium is used extensively in nuclear engineering as an excellent neutron reflector and neutron multiplier material due to its very low threshold for the (n, 2n) reaction, starting at about 2 MeV.

As an example, inserting a layer of Be-loaded material around the higher-Z material in a WENDI-type neutron moderator makes the detector more sensitive in the energy range of 5-100 MeV due to the direct (n,2n) reactions of the incident neutrons in beryllium. The invention takes advantage of the neutron multiplication processes in Be, when the incoming neutrons in this energy range, or the secondary neutrons, knocked out of the higher-Z material, produce extra neutrons in the Be-loaded material, thereby improving the sensitivity of the moderator. Adding the Beryllium layer also helps to regularize the response function further, using the thickness of the Be-loaded layer as an extra optimization parameter.

The meaning of "neutron fluence", also referred to as the neutron dose, is defined as the time integral of the neutron flux density, expressed as the number of particles (neutrons) per cm$^2$. Neutron flux is a scalar quantity used in nuclear physics and nuclear reactor physics. It is defined as the total length traveled by all free neutrons per unit time and volume.

Figure 1:
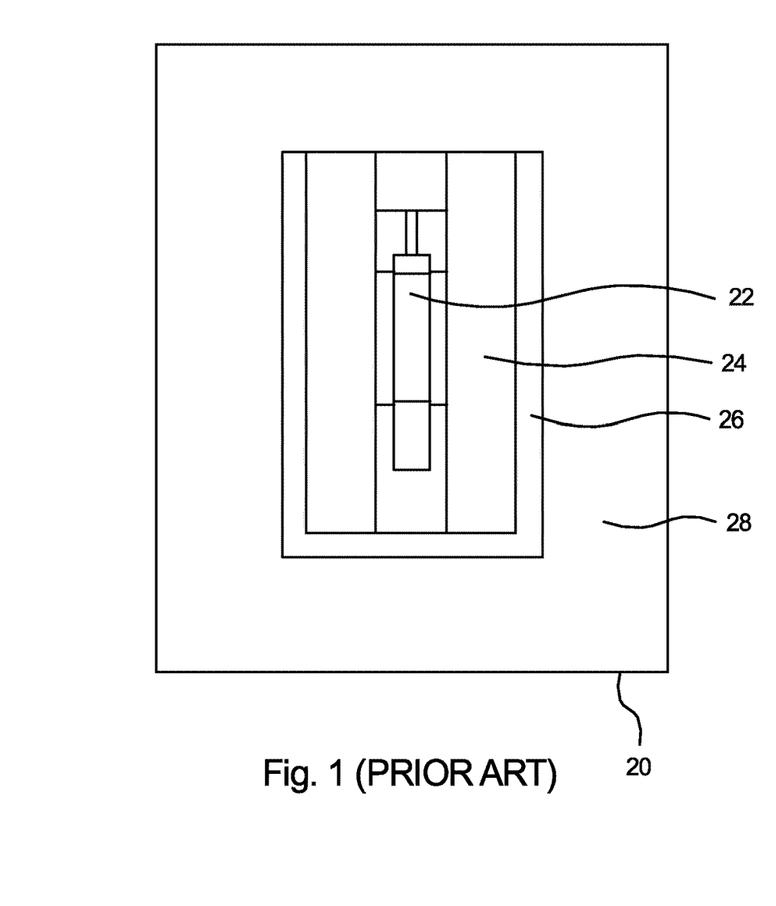
FIG. 1 depicts a conventional WENDI-type neutron rem meter moderator.
Figure 2:
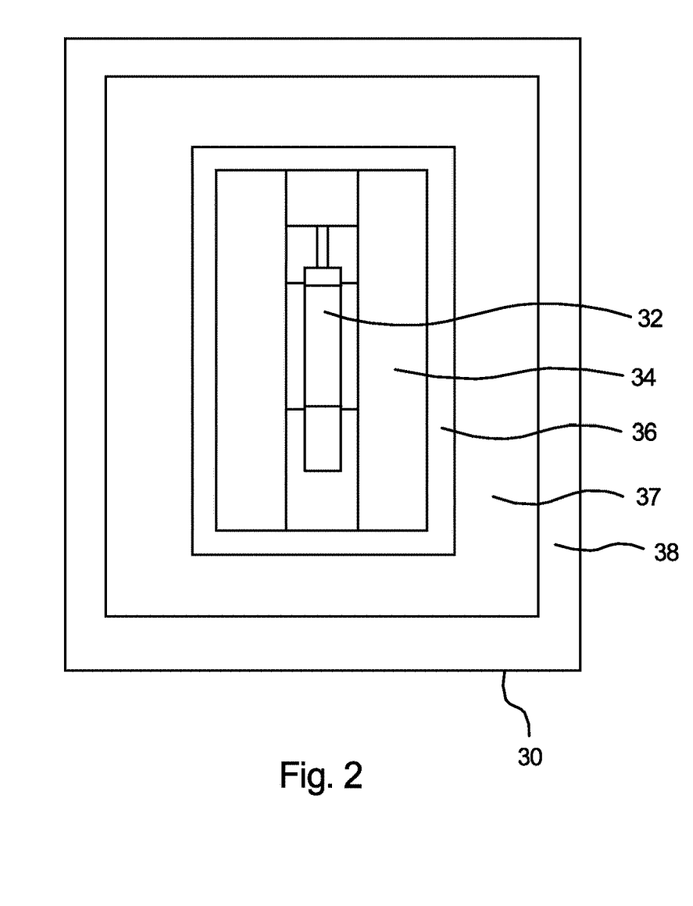
FIG. 2 depicts a first embodiment of a Be-loaded neutron rem meter moderator according to the present invention, with the moderator in a cylindrical shape.

The illustration of the moderators' model geometries, implemented in the FLUKA simulation package, is shown in FIG. 1 for the WENDI-type moderator and in FIG. 2 for the proposed cylindrical moderator of the present invention. FLUKA, available by license from FLUKA.org, is a simulation package for the interaction and transport of particles and nuclei in matter. The calculations of the detector response functions were performed in FLUKA, assuming that the neutron detector used in the detectors is a $^3$He-filled IC.

With reference to FIG. 1 there is shown a conventional WENDI-type moderator assembly 20 of cylindrical shape. The moderator assembly 20 includes a neutron detector 22, an inner moderator layer 24 typically constructed of high density polyethylene, a high-Z inner material layer 26 typically constructed of tungsten powder, and an outer moderator layer 28 typically constructed of high density polyethylene. The WENDI-type moderator 20 typically under-responds in the range of thermal neutron energies (1-100 meV) and in the range of 10-30 MeV where the contribution of the multiplication reactions is still relatively small, but they over-respond at higher neutron energies such as above 1 GeV.

Referring to FIG. 2, a first embodiment of a Be-loaded rem meter neutron moderator assembly according to the present invention. Moderator assembly 30 is a cylindrical moderator that includes a neutron detector 32, an inner moderator layer 34 constructed of high density polyethylene, a medium-Z inner material layer 36 preferably constructed of copper alloyed with 2-10% beryllium and more preferably 5-10% beryllium, a beryllium-loaded layer 37 constructed of Be metal, and an outer moderator layer 38 preferably constructed of high density polyethylene. Moderator assembly 30 is a cylindrical moderator with overall dimensions of 28 cm diameter by 40 cm length.

Figure 3:
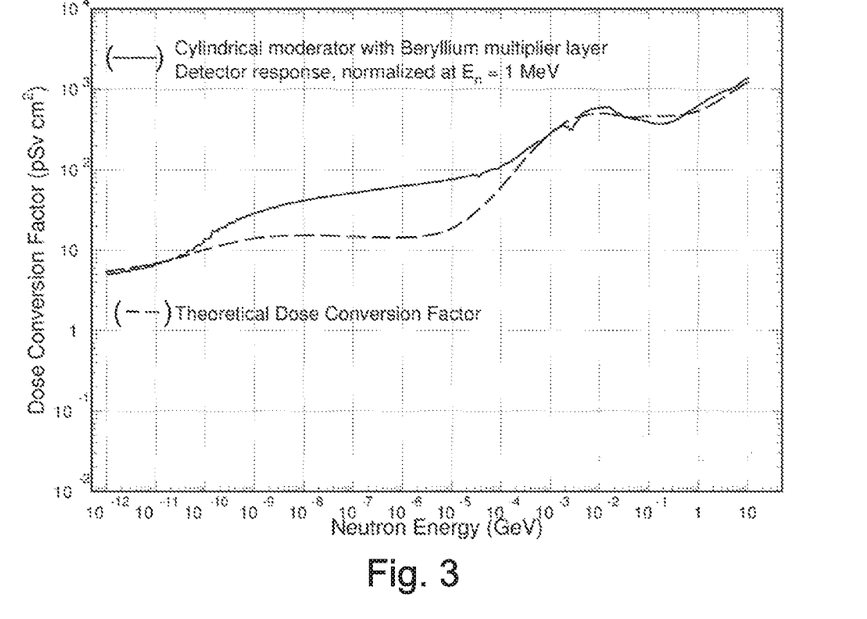
FIG. 3 is a plot comparing the response functions for the cylindrical Be-loaded moderator of FIG. 1 with the theoretical dose-equivalent conversion factor function, normalized at En=1 MeV.
Figure 4:
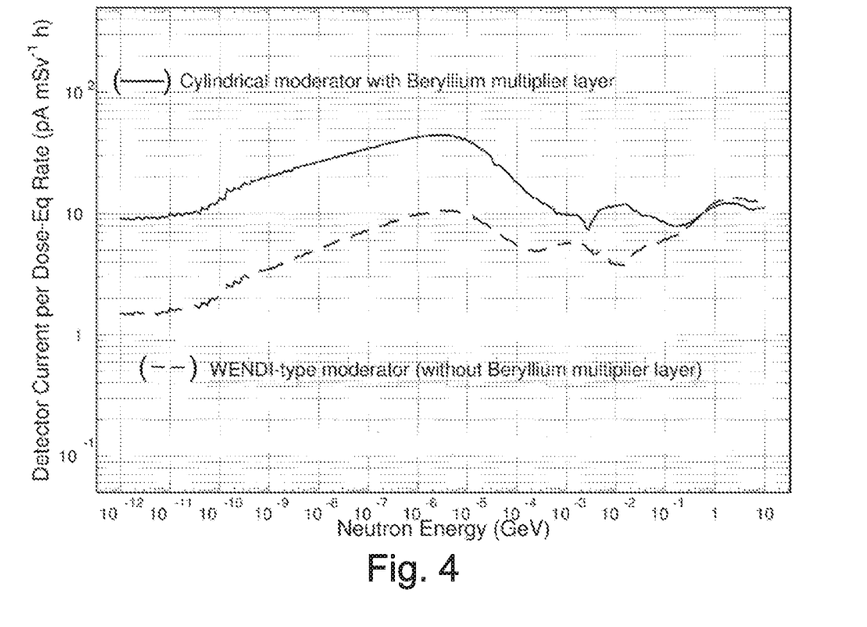
FIG. 4 is a plot comparing the response functions for the cylindrical Be-loaded moderator of FIG. 1 with the response functions for a WENDI-type moderator design, normalized by the theoretical conversion factor.

FIG. 3 illustrates the comparison of the response function of the cylindrical Be-loaded rem meter neutron moderator assembly 30 with the theoretical dose-equivalent conversion factor function, normalized at En=1 MeV, assuming that the neutron detector is comprised of the $^3$He-filled IC 32 with $^3$He gas at 10 atm. FIG. 4 shows the comparison of the normalized response of the proposed cylindrical moderator rem meter 30 with a WENDI-type moderator, using the same neutron sensors, normalized by the theoretical conversion factor.

Figure 5:
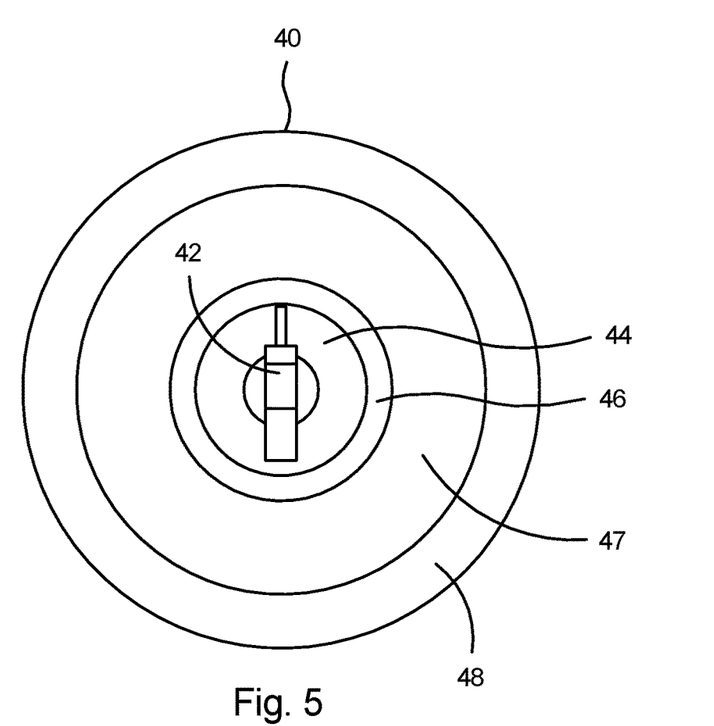
FIG. 5 depicts a second embodiment of a Be-loaded rem meter moderator embodiment, with the moderator in a spherical shape.

With reference to FIG. 5, the beryllium-loaded neutron moderator of the present invention may also be implemented in the shape of a sphere, giving the advantage of better directional uniformity of the detector, and the extra advantage of lower weight as compared with the cylindrical embodiment. As shown in FIG. 5, a second embodiment is a spherical beryllium-loaded neutron moderator 40 including a small-volume neutron detector 42. The spherical Be-loaded moderator 30 includes an inner moderator layer 44 constructed of high density polyethylene, a medium-Z inner material layer 46 preferably constructed of copper alloyed with 2-10% beryllium and more preferably 5-10% beryllium % beryllium, a beryllium-loaded layer 47 constructed of Be metal, and an outer moderator layer 48 preferably constructed of high density polyethylene. Radius of the spherical moderator assembly 40 is 16 cm. The neutron detectors 22, 32, and 42 at the center of the compact cylindrical or spherical moderators 20, 30, and 40 of FIGS. 1, 2, and 5 may be constructed of various types of compact neutron sensors such as $^3$He-filled ICs, $^3$He-filled or $^{10}$BF3-gas-filled proportional counters or $^6$Li-doped glass scintillator.

Figure 6:
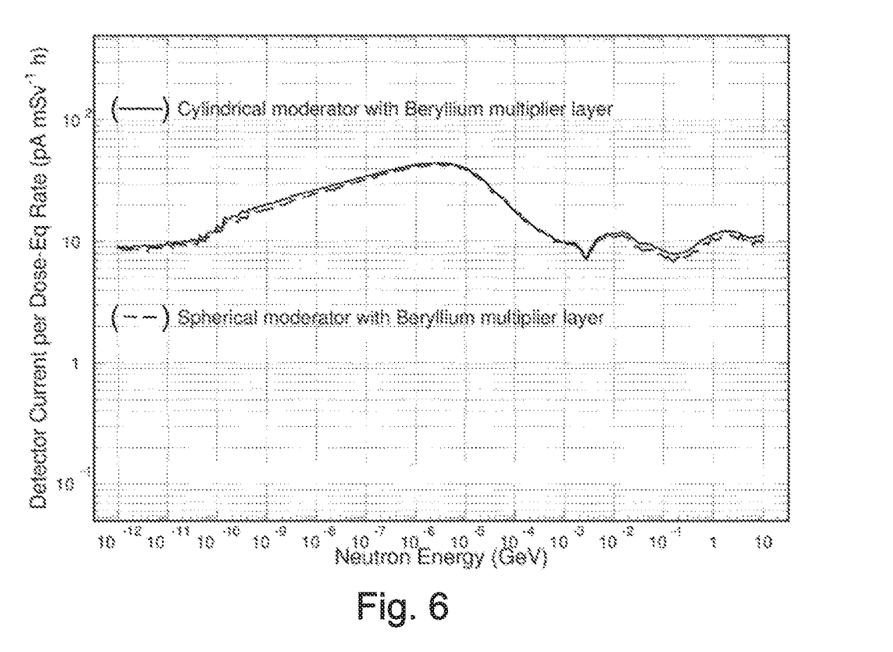
FIG. 6 is a plot comparing the response functions of a cylindrical Be-loaded moderator embodiment and a spherical Be-loaded moderator embodiment, normalized by the theoretical conversion factor function.

FIG. 6 shows a comparison of the response functions for the compact cylindrical Be-loaded moderator 30 and the spherical Be-loaded moderator 40, normalized by the theoretical conversion factor function, assuming that the neutron detectors are comprised of the $^3$He-filled ICs 32 and 42 with $^3$He gas at 10 atm.

A beryllium-loaded neutron moderator according to the present invention will have increased sensitivity as compared to conventional neutron detectors, and the rem meter energy response function will better correspond to the theoretical conversion factors. Having an extra tune up parameter also enables optimizing the detector response in case of possible changes in the accepted shape of the conversion factor function, such as may be required by the regulatory agencies.

Figure 7:
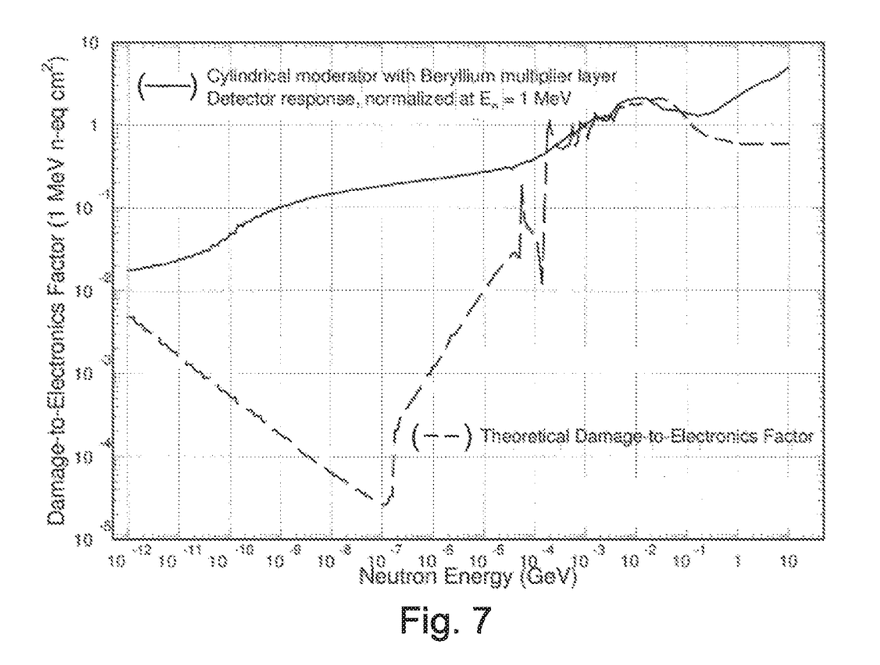
FIG. 7 is a plot comparing the response functions of a cylindrical Be-loaded moderator embodiment with the theoretical "Damage-to-Electronics" conversion factor function, optimized for the neutron energy range of 500 keV to 100 MeV, and normalized at En=1 MeV.

A neutron moderator according to the present invention provides a method of tuning the energy response function to the available theoretical model description of neutron damage to typical electronics components, measured in the units of equivalent fluence of 1-MeV neutrons. As in the case of the rem-meter moderator embodiment, the moderator for the measurement and monitoring of damage to electronics includes a beryllium layer, which in combination with other material layers in the moderator makes the detector response function close to the theoretical one in wide range of energies. FIG. 7 illustrates application of this method for the beryllium-loaded cylindrical embodiment 30 (see FIG. 2) by showing in comparison the detector response to the "damage-to-electronics" theoretical function, properly normalized. A reasonably good agreement between the shapes of the functions is observed in the energy range from about 100 keV to about 100 MeV, covering many practical implementation cases.

Figure 8:
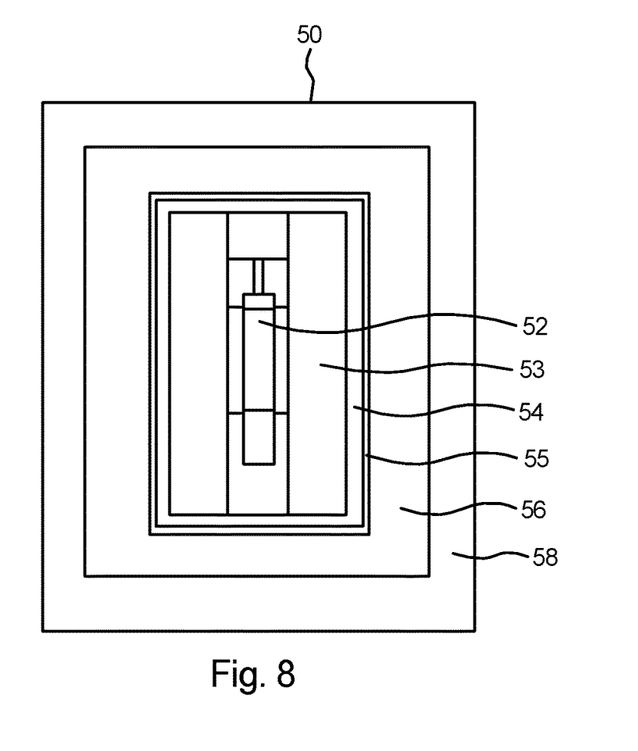
FIG. 8 depicts a third embodiment according to the invention, a Be-loaded "damage-to-electronics" meter moderator.
Figure 9:
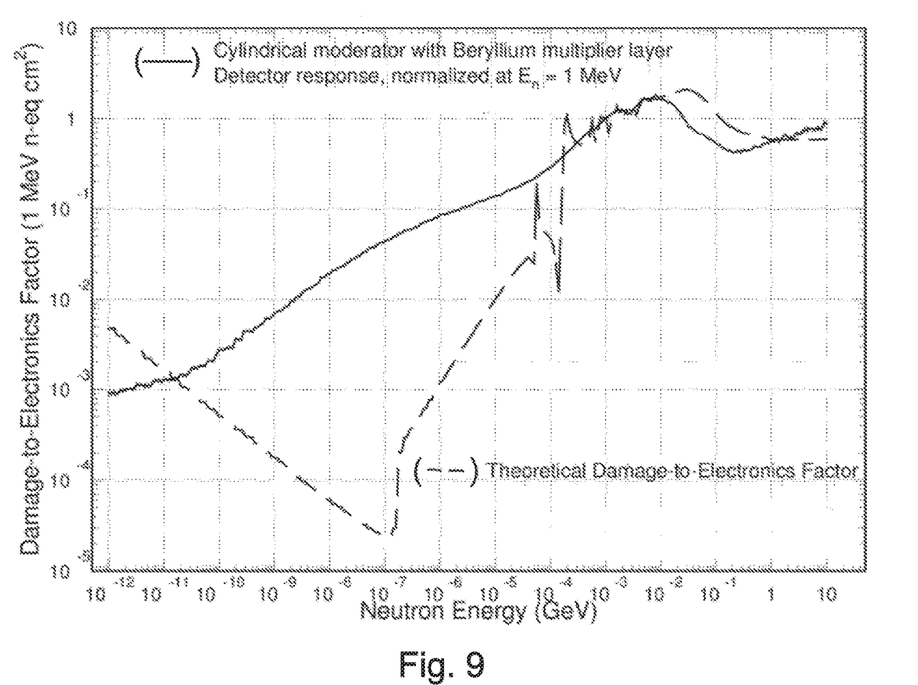
FIG. 9 is a plot comparing the response functions for the Be-loaded "damage-to-electronics" moderator embodiment, with the theoretical "damage-to-electronics" conversion factor function, optimized for the neutron energy range of 500 keV to 100 MeV, and normalized at En=1 MeV.

Referring to FIG. 8, a third embodiment is illustrated in which the "damage-to-electronics" response can be better tuned to include thermal neutron energy range and the high energy range up to 10 GeV. The third embodiment is a damage-to-electronics moderator assembly 50 including a neutron detector 52. An inner moderator layer 53 is constructed of high density polyethylene, a medium-Z inner material layer 54 is preferably constructed of copper alloyed with 2-10% beryllium and more preferably 5-10% beryllium %, a thermal neutron absorber layer 55 constructed of borated polyethylene, a beryllium-loaded layer 56 constructed of Be metal, and an outer moderator layer 58 constructed of high density polyethylene. The cylindrical damage-to-electronics moderator 50 includes overall dimensions of 25 cm diameter by 36 cm length. FIG. 9 shows a comparison of the response functions for the cylindrical Be-loaded "damage-to-electronics" moderator 50, with the theoretical "damage-to-electronics" conversion factor function.

Another embodiment of the present invention includes a neutron dose rate meter based on a method of using an IC filled with $^3$He gas as an element sensitive to a moderated-neutron fluence, The neutron dose rate meter further includes a symmetric ionization chamber device filled with regular helium to evaluate the contributions and make necessary corrections due to the non-neutron ionizing radiation.

Figure 10:
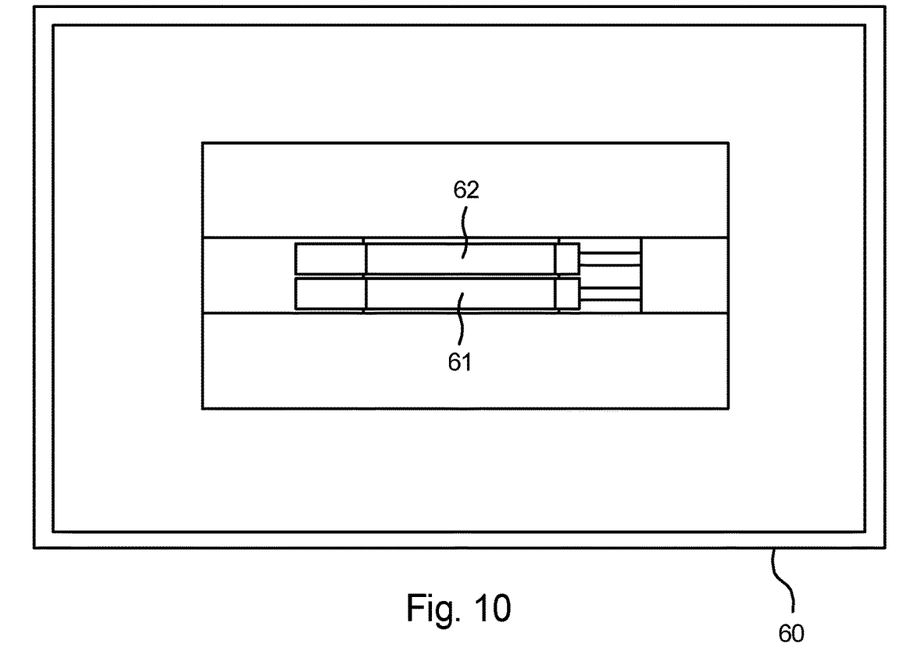
FIG. 10 is a mid-plane sectional view of a fourth embodiment according to the invention, a neutron detector for use in strong gamma-radiation environments.

With reference to FIG. 10, a fourth embodiment of a moderator assembly for use as a neutron detector 60 in strong gamma-radiation environments. The neutron detector 60 includes two cylindrical ICs 61 and 62 filled respectively with $^4$He and $^3$He gases at 1-20 atm. The cylindrical ICs 61 and 62 are centered on the central axis of a moderator assembly made of several material layers. The difference between the currents in the $^3$He and the $^4$He ICs represents the neutron dose rate response of the detector. Moderator assembly 60 is a cylindrical moderator with overall dimensions of approximately 24 cm diameter by 36 cm length.

Figure 11:
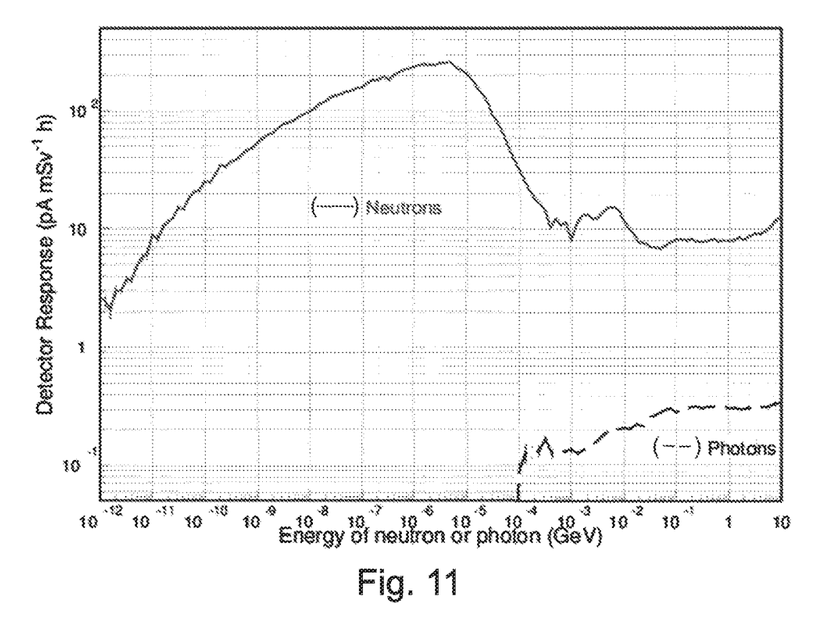
FIG. 11 is a plot depicting the ionization current responses of the strong gamma-radiation environment detector calculated using the FLUKA Monte Carlo simulation tool as a function of the neutron or photon energy per unit of radiation dose rate at the detector placed in a neutron or gamma radiation field.

FIG. 11 shows the ionization current responses, calculated using the FLUKA Monte Carlo simulation tool as a function of the neutron or photon energy, per unit of radiation dose rate at the detector 60 placed in neutron or gamma radiation fields. The plot illustrates the degree of insensitivity of the detector to gamma radiation, and the ability to correct the result even in the overwhelming, such as up to a factor of several hundred higher dose rates, presence of the gamma field. Several realistic scenarios of neutron dose rate measurements in the presence of the strong gamma radiation fields are considered, including the radiation environment around the experimental targets at the Continuous Electron Beam Accelerator (CEBAF) at the Jefferson National Accelerator (JLab) in Newport News, Va., in the radiation environment around typical photon therapy facilities, and in the nuclear fuel recovery efforts during severe nuclear power accidents.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A neutron dose rate meter comprising:
   a neutron detector;
   an inner moderator layer surrounding said neutron detector;
   a medium-Z inner layer surrounding said inner moderator layer;
   a beryllium-loaded layer surrounding said medium-Z layer; and an outer moderator layer surrounding said beryllium-loaded layer.

2. The neutron dose rate meter of claim 1 wherein said neutron detector comprises an ionization chamber filled with helium-3 (3He) at 1 to 20 atmospheres (atm).

3. The neutron dose rate meter of claim 1 wherein said medium-Z inner layer comprises copper alloy with 2-10% beryllium.

4. The neutron dose rate meter of claim 1 wherein said beryllium-loaded layer comprises beryllium (Be) metal.

5. The neutron dose rate meter of claim 1 wherein said inner moderator layer comprises high density polyethylene.

6. The neutron dose rate meter of claim 1 wherein said neutron moderator is cylindrical.

7. The neutron dose rate meter of claim 1 wherein said neutron moderator is spherical.

8. The neutron dose rate meter of claim 1 wherein said neutron detector includes material selected from the group consisting of 3He-gas-filled proportional counter, 10BF3-gas-filled proportional counter, and 6Li-doped glass scintillator.

9. The neutron dose rate meter of claim 1 wherein said beryllium-loaded layer includes material selected from the group consisting of beryllium metal, beryllium alloys, and beryllium oxide (BeO).

10. The neutron dose rate meter of claim 1 wherein the response function of the said combination of inner moderator layer, medium-Z inner layer, beryllium-loaded layer, and outer moderator layer is within 20% of the theoretical response function in a neutron energy range of 1-100 meV and in an energy range of 500 keV to 10 GeV.

11. A neutron damage rate meter for evaluating radiation damage to electronics comprising:
  a neutron detector;
  an inner moderator layer surrounding said neutron detector;
  a medium-Z inner layer surrounding said inner moderator layer;
  a thermal neutron absorber layer surrounding said medium-Z layer;
  a beryllium-loaded layer surrounding said thermal neutron absorber layer; and
  an outer moderator layer surrounding said beryllium-loaded layer.

12. The neutron damage rate meter of claim 11 wherein said thermal neutron absorber layer comprises borated polyethylene.

13. The neutron damage rate meter of claim 11 wherein said neutron detector comprises an ionization chamber filled with helium-3 (3He) at 1 to 20 atmospheres (atm).

14. The neutron damage rate meter of claim 11 wherein said medium-Z inner layer comprises copper alloy with 2-10% beryllium.

15. The neutron damage rate meter of claim 11 wherein said beryllium-loaded layer comprises beryllium (Be) metal.

16. The neutron damage rate meter of claim 11 wherein said inner moderator layer comprises high density polyethylene.

17. The neutron damage rate meter of claim 11 wherein said neutron detector includes material selected from the group consisting of 3He-gas-filled proportional counter, 10BF3-gas-filled proportional counter, or 6Li-doped glass scintillator.

18. The neutron damage rate meter of claim 11 wherein said beryllium-loaded layer includes material selected from the group consisting of beryllium metal, beryllium alloys, and beryllium oxide (BeO).

19. A neutron dose rate meter for use in strong gamma-radiation environments, comprising:
  a moderator assembly having a central axis;
  a first ionization chamber in said moderator assembly;
  a second ionization chamber in said moderator assembly;
  said first and second ionization chambers centered around said central axis of said moderator assembly;
  said first ionization chamber filled with helium-3 (3He) gas at 1-20 atmospheres;
  said second ionization chamber filled with helium-4 (4He) gas at 1-20 atmospheres; and
  a moderator layer surrounding said ionization chambers, wherein the difference between the currents in the first and second ionization chambers represents the neutron dose rate response of the detector.

* * * * *